A. NASH.
Thrasher and Grain Separator.
No. 7,271.
2 Sheets—Sheet 1.
Patented April 9, 1850.
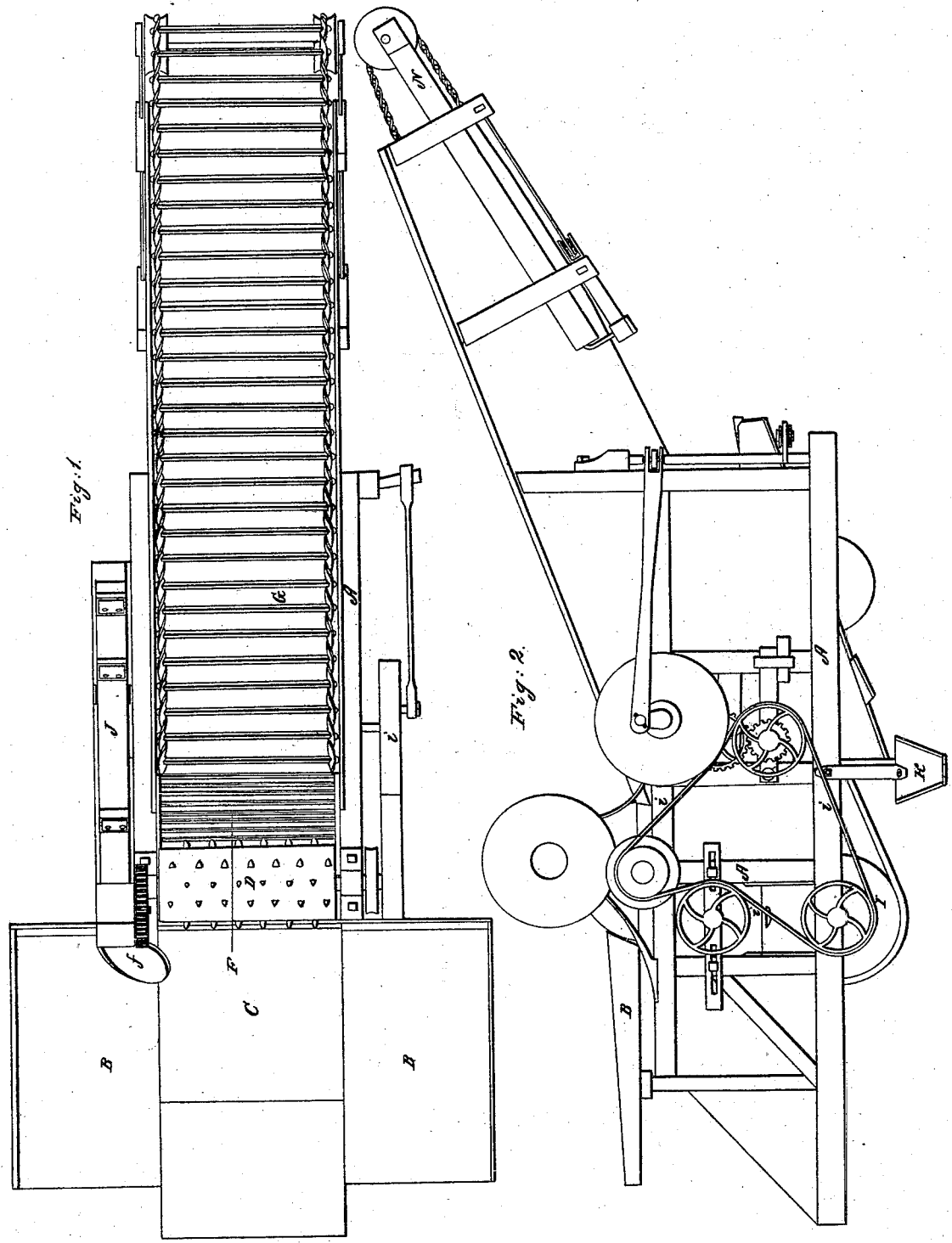

A. NASH.
Thrasher and Grain Separator.
No. 7,271. Patented April 9, 1850.
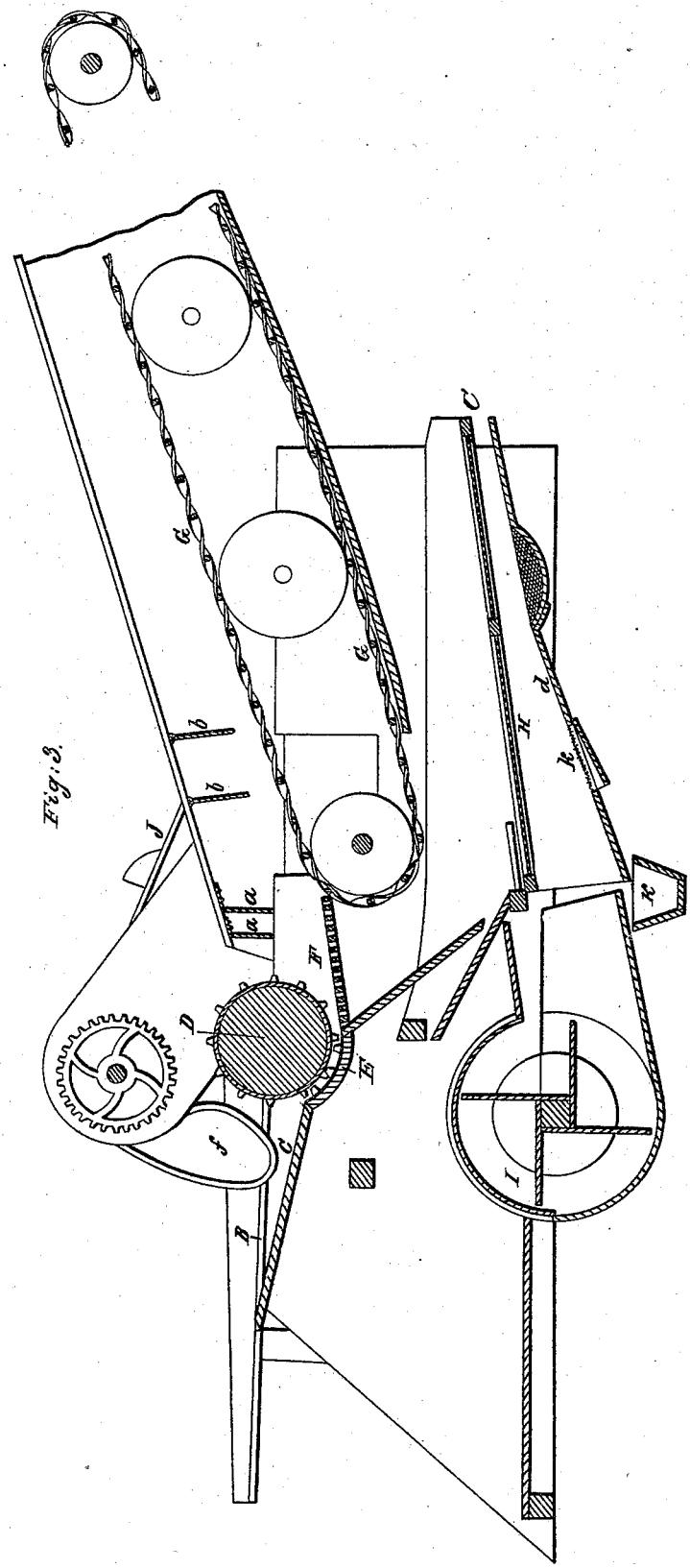

UNITED STATES PATENT OFFICE.

ADKINS NASH, OF LOGANSPORT, INDIANA.

ENDLESS APRON FOR THRESHERS.

Specification of Letters Patent No. 7,271, dated April 9, 1850.

*To all whom it may concern:*

Be it known that I, ADKINS NASH, of Logansport, in the county of Cass and State of Indiana, have invented certain new and useful Improvements in Machines for Threshing and Cleaning Grain, of which the following is a full, clear, and exact description, reference being had to the accompanying drawing, which forms part of this specification and in which—

Figure 1 is a plan of my machine, Fig. 2 an elevation of the same, and Fig. 3 a vertical longitudinal section through the machine.

My machine is constructed to receive the unthreshed grain, to separate the straw from the grain, and to deliver the latter as clean as when discharged from an ordinary winnowing machine.

In the drawing A is the frame of my machine to which the remaining members are attached. At one end of this frame are the tables, B, B, on which the sheaves are opened; the apron, C, being between the tables, and slanting gradually to a toothed cylinder, D, delivering the unthreshed grain between it and a toothed concave, E, by the action of which the grain is detached from the straw. As the bruised mass leaves the concave it passes over a grating F composed of bars extended transversely across the machine, the forward edges of these bars are beveled off to give an upward direction to the straw striking them while their straight sides allow the grain to pass through, thus obviating the clogging to which grate bars of the usual form are liable. The straw thrown upward by the action of the cylinder and by the beveled edges of the grate bars strikes against stationary beaters a, a, extended downward from the top of the casing, which greatly assists in disengaging the grain. As the straw leaves the stationary grating it is received upon a moving endless grating, G, by which it is discharged from the machine. This endless grating is inclined upward, and the straw in its passage is exposed to the action of flaps or hinged beaters, b, b, depending from the top of the casing, by which those portions of the grain which have escaped the stationary grating and fixed beaters are expelled from the straw. The endless grating is supported on rollers which are so proportioned that its lower or returning side is retained in the arc of the catenary curve which it would naturally assume if hung from the two extreme rollers alone; at the same time that the upper or advancing side is carried along in a straight line. In the return motion of the endless grating the bars running along the bottom of the case, which is also made in the arc of the catenary, gather the grain falling from the straw above and deliver them to shaking riddles H, where this together with the matters which pass through the fixed grate, F, are acted upon by a blast generated by a fan, I, secured to the lower portion of the main frame. By this the lightest and bulkiest portions of the mass consisting mainly of chaff and fragments of straw are at once expelled at the open end, c, of the shoe, and the heavier portions passing through the riddle fall upon an inclined screen board, d, down which they run against the blast produced by the fan; during this process the lighter portions consisting mainly of white caps and heads are separated from the denser, and being discharged through an opening, e, at the side of the machine, are taken up by an elevator, J, and being delivered by a spout, f, upon the unthreshed grain, are submitted a second time to the action of the cylinder and concave. As the denser portions of the mass pass down the screen board they are screened by a screen k sunk in its upper surface and are finally discharged immediately in front of the fan case and delivered through an opening provided for the purpose, into an inclined gutter, K, by which they are collected and delivered at the side of the machine.

The power of the prime mover is imparted to the machine by a belt running upon a pulley secured to the shaft of the cylinder and the other moving members of the machine are driven from this shaft; thus the belt i, drives the fan I, the endless grating G, and the shaking riddle H, and the elevator is driven from the same belt through an intermediate shaft which has a cog wheel secured to it which gears into a mate secured to the shaft of the upper elevator drum.

The endless grating is constructed in a manner peculiar to this machine, viz: by notching the extremities of the bars and passing them through slits made at equal intervals in strips of hide which are twisted to bind them tightly down upon the notched extremities of the bars, thus effectually securing them in place: this method of construction keeps the bars in their places more effectually than any method previously used, while it requires but little time to remove a broken bar and replace it with a new one. The band is tightened by securing the last roller to an adjustable frame, N, which can be moved endwise. The proportioning of the supporting rollers in the manner described so as to keep the lower portion of the band from rising and yet retain it in the arc of the catenary which it would naturally assume is of great advantage, as it forces the returning bars to carry down the grain falling from the straw above while at the same time it does away with the great straining and consequent friction required to make a hanging belt move in a straight line.

Having thus described my thresher and grain separator, what I claim therein as my invention and desire to secure by Letters Patent, is—

The endless grating composed of bars secured to the hide or leather straps by twisting the latter in the manner and for the purposes herein set forth.

In testimony whereof I have hereunto signed my name.

ADKINS NASH.

Witnesses:
Wm. D. Washington,
P. H. Watson.